United States Patent [19]

Chandramouli et al.

[11] Patent Number: 4,961,186

[45] Date of Patent: Oct. 2, 1990

[54] COMMUNICATION CHANNEL REALLOCATION

[75] Inventors: Bopsi Chandramouli, Aurora; Gary L. Eppling, Woodridge; Susan J. Tripp, Warrenville, all of Ill.

[73] Assignee: AT&T Bell Laboratories, Murray Hill, N.J.

[21] Appl. No.: 278,085

[22] Filed: Nov. 30, 1988

[51] Int. Cl.$^5$ .................................... H04L 12/00
[52] U.S. Cl. .................................... 370/79; 370/110.1
[58] Field of Search ........................ 370/58.2, 62, 68.1, 370/79, 80, 85.1, 85.6, 85.7, 110.1; 379/178, 182

[56] References Cited

U.S. PATENT DOCUMENTS

| | | | |
|---|---|---|---|
| 4,592,048 | 5/1986 | Beckner et al. | 370/60 |
| 4,723,273 | 2/1988 | Diesel et al. | 379/210 |
| 4,792,800 | 12/1988 | Fujioka et al. | 370/110.1 |

OTHER PUBLICATIONS

CCITT Recommendation I.430 (1985), "ISDN User--Network Interfaces: Layer 1 Recommendations," See Section 3.2, p. 142, and Section 4.2, p. 144.

5ESS ® Switch ISDN Basic Rate Interface Specification 5E4 Generic Program, AT&T 5D5-900-301, Sep. 1985, pp. IV-34 through IV-63 and pp. V-3 through V-6.

Primary Examiner—Douglas W. Olms
Assistant Examiner—Melvin Marcelo
Attorney, Agent, or Firm—Ross T. Watland

[57] ABSTRACT

A call processing method and apparatus in which a channel that was allocated to one terminal for processing a call is reallocated to allow another terminal to process the call. The channel is one of several channels of the digital subscriber line. In processing a call, the switching system allocates a channel for the exclusive use of a terminal sharing the digital subscriber line. While the channel is allocated to the terminal, only that terminal can use the channel. The switch enables another terminal sharing the digital subscriber line to process the call by reallocating the channel for the exclusive use of the other terminal.

24 Claims, 9 Drawing Sheets

COMMUNICATION CHANNEL REALLOCATION

CROSS-REFERENCE TO RELATED APPLICATIONS

This application relates to an application by G. M. Abramovici, et al., Ser. No. 278,067 entitled "Communication Channel Reservation," concurrently filed herewith and assigned to the same assignee as this application.

TECHNICAL FIELD

This invention relates to an integrated services digital network (ISDN) system in which a plurality of terminals share via a multipoint interface a common line to a switching system. The invention further pertains to facilities for maximizing the number of calls that can be reliably served over a fixed number of B-channels in the ISDN system.

BACKGROUND AND PROBLEM

Multiple terminals, such as ISDN station sets, are connectable to a single digital subscriber line with an Integrated Services Digital Network (ISDN) multipoint interface, defined in Recommendation I.430 of the International Telegraph and Telephone Consultative Committee (CCITT). The terminals share the B-channels and D-channels that comprise the digital subscriber line. For a terminal to process a circuit switched voice or data call, a B-channel must be allocated to the terminal. The switching system allocates a B-channel to a terminal by setting up a path through the switching system to allow access to the B-channel and defining the B-channel as being used only by that terminal. When none of the limited number of B-channels are available for allocation to a terminal for processing a call, the terminal is referred to as B-channel blocked.

Setting up a path through the switching network significantly adds to answer delay if performed after a request has been received from a terminal to answer a call or to retrieve a call from hold. To avoid having the path setup contribute to answer delay, the switching system allocates a B-channel to a terminal before offering the call to the terminal.

A terminal does not always use the B-channel that has been allocated to it. For example, the switch may allocate a B-channel to a terminal when offering a call to the terminal. The allocated B-channel remains unavailable to other terminals while the terminal is ringing in response to the call even if the call is never answered at the terminal. Similarly, a B-channel remains allocated for a terminal that has placed a call on hold even if the terminal is not processing other calls using the B-channel.

The switch allocates a B-channel to a terminal to insure that a B-channel is available for processing a call. When the terminal does not process the call or at least use the B-channel for another call, unnecessary B-channel blocking may occur. This is especially troublesome when the B-channel blocking prevents another terminal on the same digital subscriber line from processing the call.

In each of the following examples, a B-channel is allocated to one terminal for a call but that terminal is not processing the call. Another terminal that could process the same call is B-channel blocked because of the allocation to the terminal that is not processing the call. The B-channel allocation has reduced by one the number of available B-channels. For example, another terminal may share the called directory number with the terminal that was allocated the B-channel. When the other terminal attempts to answer the call to the shared directory number, it is B-channel blocked. Similarly, another terminal has a call pick-up capability enabling it to answer calls alerting at other terminals. Using the call pick-up capability, the other terminal requests to answer the call only to be B-channel blocked. In another example, a terminal other than the terminal that put a call on hold may request to retrieve the call from hold but is unable to do so because it is B-channel blocked. Blocking can also occur if a call forwarding feature is active at the terminal that was allocated the B-channel. The switch can only forward the call to another terminal on the digital subscriber line when a B-channel can be allocated to the forward-to terminal.

Since in most arrangements the digital subscriber line has only two B-channels, allocating a B-channel before offering a call significantly limits the number of available B-channels and increases the probability of some terminals on the digital subscriber line becoming B-channel blocked. The B-channel allocation, which was performed to insure that the call could be processed, contributes to blocking the call from being processed.

Thus, a recognized problem in the art is unnecessarily restricting use of B-channels when insuring that a B-channel remains available for processing each call active on the digital subscriber line.

SOLUTION

This problem is solved with a call processing method and apparatus in which a channel that was allocated to one terminal for processing a call is advantageously reallocated to allow another terminal to process the call. In processing a call, the switching system allocates a channel for the exclusive use of a terminal sharing the digital subscriber line. While the channel is allocated to the terminal, only that terminal can use the channel. The switch enables another terminal sharing the digital subscriber line to process the call by reallocating the channel for the exclusive use of the other terminal. An advantage of the reallocation arrangement is that the path setup by the original allocation is reused thereby avoiding the increased answer delay that would result if an additional path setup were required.

In an exemplary call processing method, the switch determines whether the terminal originally allocated the channel requires the channel for processing any other calls. The switch only reallocates the channel if the terminal does not require it for any other calls. In one arrangement, the switching system stores all data defining any calls that are assigned to the B-channel. The switching system reads this call data to determine whether the terminal requires the channel for processing other calls assigned to that channel. In an alternative arrangement, the switching system reallocates the channel only when the terminal does not require the channel for processing any calls other than unanswered calls that address both terminals.

In an illustrative call processing method, an incoming call arrives for a directory number shared by two terminals on a digital subscriber line. The switching system requests both terminals to alert in response to the incoming call. The switching system allocates a channel of the digital subscriber line for the exclusive use of one of the terminals. In response to a request from the other terminal to answer the call, the switching system enables the other terminal to answer the call by reallocating the channel for the exclusive use of the other terminal.

In another illustrative call processing method, reallocation is used to enable a terminal to retrieve a call that another terminal sharing the same digital subscriber line has put on hold. When a call is placed on hold, the channel that was allocated to the terminal for handling the call remains allocated to the terminal to allow the terminal to retrieve the call from hold. The switching system reallocates the channel in response to a request from another terminal to retrieve the call.

In other illustrative call processing methods, reallocation is used to enable a terminal other than the terminal originally allocated a channel in response to an incoming call to process the call. For example, reallocation is used to allow a call to be forwarded from one terminal to another terminal on the same digital subscriber line. After a channel has been allocated to a terminal, the switching system determines that the call is to be forwarded to another terminal sharing the same digital subscriber line. The switching system enables the forwarded call to be processed by reallocating the channel to the terminal to which the call is forwarded.

Similarly, reallocation is used to allow a call for which one terminal has been allocated a channel to be answered by another terminal on the same digital subscriber line using a call pick-up feature. The call pick-up feature allows a terminal to answer calls alerting at other terminals. The switching system receives a request from the terminal with the call pick-up feature to answer the call. In response to the request, the switching system enables the other terminal to process the call by reallocating the channel to the other terminal.

In one illustrative embodiment, a switching system is connected to a plurality of terminals by a single line having several B-channels and a D-channel. In response to a call, the switching system allocates a B-channel to a terminal. When the switching system determines that another terminal other than the terminal allocated the B-channel is to process the call, the switching system attempts to reallocate the B-channel. The switching system examines call data stored for the terminal defining any calls at the terminal that are assigned to the B-channel to determine whether the terminal requires the B-channel for processing any other calls. If the terminal does not require the B-channel for any other calls, the switching system reallocates the B-channel for the exclusive use of another terminal and enables that other terminal to process the call using the B-channel.

The switching system may determine that another terminal is to process the call by receipt of a request from the other terminal to answer the call. The switching system may also determine that another terminal is to process the call because a call forwarding feature indicates that the call is to be forwarded to the other terminal.

The switching system receives call processing requests over the D-channel from the connected terminals. For example, the switching system may receive requests from a terminal to answer a call and requests to put a call on hold or to retrieve a call from hold. The switching system may also receive a request to use a call pick-up feature to answer a call. All these requests ae made by the terminals sending messages to the switching system over the D-channel. Similarly, the switching system sends messages to connected terminals over the D-channel. For example, the switching system uses the D-channel to request the terminals to alert in response to incoming calls.

An illustrative switching system connects to a plurality of terminals. The switching system includes means for allocating a channel of a digital subscriber line to a terminal. These allocating means function in response to a call. The switching system also includes means for enabling another terminal to process the call by reallocating the allocated channel for the exclusive use of the other terminal.

The switching system further includes means for determining whether the terminal allocated the channel requires the channel for processing any other calls. The means for enabling another terminal to process the call responds to a determination that the terminal does not require the channel to process any other calls by reallocating the channel for the exclusive use of the other terminal.

DETAILED DESCRIPTION

Figure 1:
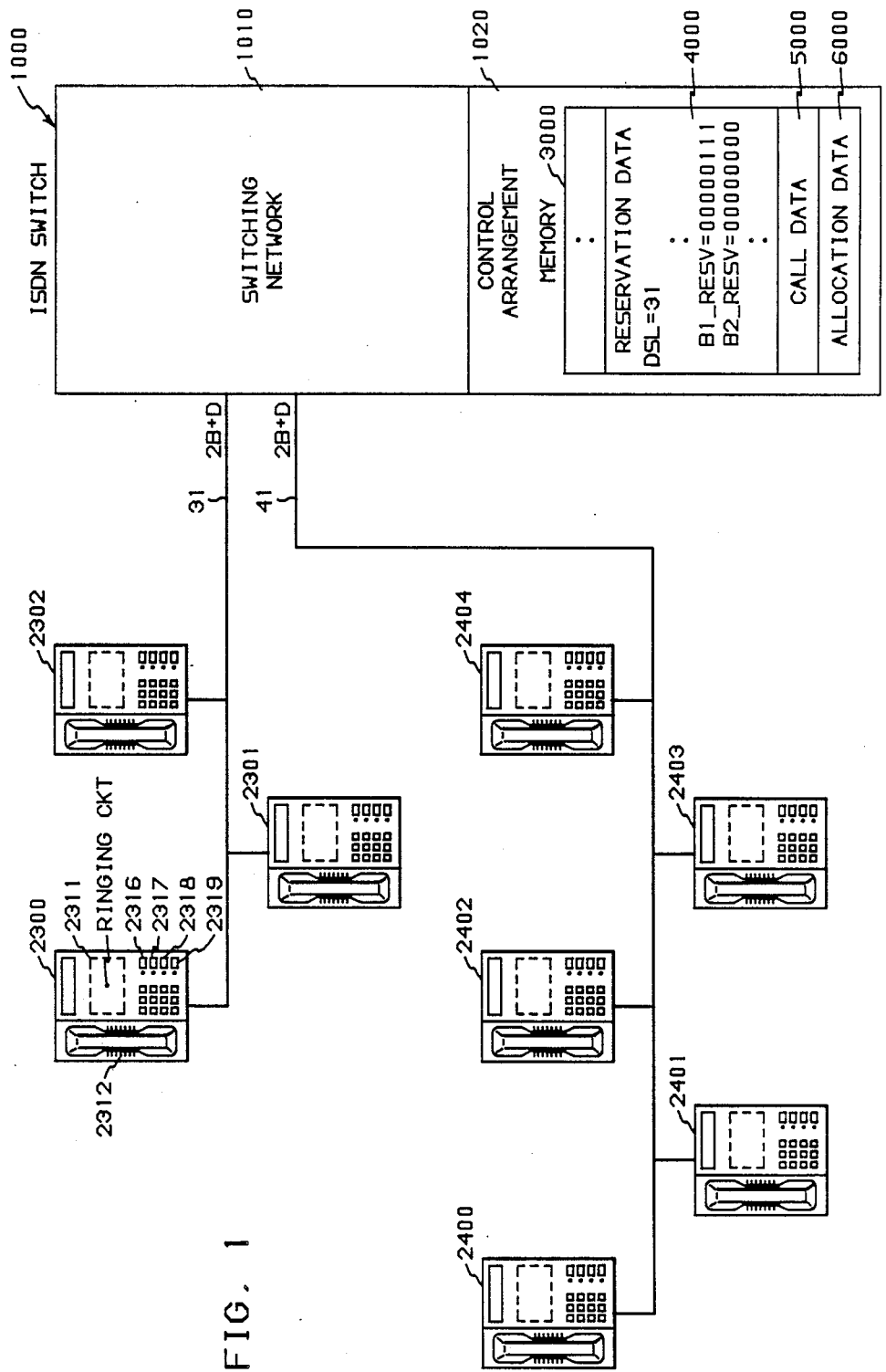
FIG. 1 is a diagram of a integrated services digital network switching system serving a plurality of terminals via multipoint interfaces.

The principles of the present invention are described in the context of an integrated services digital network (ISDN) switch 1000 (FIG. 1). An integrated services digital network is a network evolved from the telephony integrated digital network that provides end-to-end digital connectivity to support a wide range of services, including voice and non-voice services, to which users have access by a limited set of standard customer interfaces. One example of ISDN switch 1000 is the integrated packet switching and circuit switching system disclosed in U.S. Pat. No. 4,592,048 Beckner et al. Switch 1000 includes a switching network 1010, which represents, in the above-referenced exemplary integrated packet switching and circuit switching system, a plurality of time-slot interchange units and a time-multiplexed switch to provide circuit-switched connections. Switch 1000 further includes control arrangement 1020 that represents the control portion of the above-referenced exemplary switching system, including a central control and a plurality of control units that communicate via predetermined channels of the time-multiplexed switch and a control distribution unit.

Each of the two digital subscriber lines 31 and 41 connected to switch 1000 provides 144 kb/s of user accessible bandwidth: 64 kb/s for each of two B-channels and 16 kb/s for a D-channel. The two B-channels for each digital subscriber line are designated as B-channel B1 and B-channel B2. While all terminals connected to each digital subscriber line receive a 144 kb/s bandwidth, each terminal does not always require the entire bandwidth. To increase bandwidth usage and decrease outside-plant wiring costs, CCITT Recommendation I.430 allows connection of multiple terminals to a single digital subscriber line in a point-to-multipoint configuration. Terminals 2300 through 2302 are connected to digital subscriber line 31 and terminals 2400 through 2404 are connected to digital subscriber line 41.

In such an arrangement, calls completed over a B-channel to a terminal require the B-channel to be allocated to the terminal during the call. A terminal also requires an allocated B-channel when a call is originated from the terminal. When a B-channel has been allocated to a terminal, the B-channel is referred to as "owned" by the terminal. At any time, at most two terminals sharing digital subscriber line 31 could be active on calls requiring a B-channel since digital subscriber line 31 provides only two B-channels.

Although a B-channel may be owned or allocated by only one terminal, a B-channel may be reserved for one or more terminals. When a B-channel is reserved, switch 1000 only allocates the B-channel to a terminal included in the reservation. This allows only those terminals included in the reservation to originate or terminate calls using the B-channel. Switch 1000 will not allocate the reserved B-channel to other terminals. The reservation insures that the reserved channel will remain available for allocation to one of the terminals included in the reservation.

A terminal is considered B-channel blocked when no B-channels are availabe for the terminal to use in originating or terminating calls. A terminal may be B-channel blocked because the B-channels are allocated to other terminals that are active on calls or because B-channels are reserved for other terminals.

The terminals shown in FIG. 1 comprise five key-system groups 150, 160, 170, 180, and 190. A key-system group is a set of terminals that share one or more call appearances for a single directory number (DN). Key system group 150 comprises terminals 2300, 2301, and 2302. Directory number DN1 is the shared directory number for group 150. Key-system group 160 comprises terminals 2301 and 2302. Directory number DN7 is the shared directory number for group 160. Key-system group 170 comprises terminals 2400, 2401, 2403, and 2404. Directory number DN9 is the shared directory number of group 170. Key-system group 180 comprises terminals 2403 and 2404. Directory number DN12 is the shared directory number of group 180. Key-system groups may also include terminals on different digital subscriber lines. For example, key-system group 190 comprises terminal 2300 on digital subscriber line 31 and terminal 2403 on digital subscriber line 41. Directory number DN15 is the shared directory number for group 190.

If a terminal is B-channel blocked and a call arrives at the switch for a directory number shared by the terminal, the switch requests the terminal to alert silently in response to the call, provided another terminal with the same directory number is not B-channel blocked. Otherwise, the call is not offered, if all terminals with that directory number are B-channel blocked. When a terminal audibly alerts, the terminal normally generates a ringing sound to alert the terminal user. Terminal 2300, for example, includes ringing circuit 2311. When this circuit is activated a ringing sound is generated through speaker 2312. In addition, a light or indicator associated with the called directory number on the terminal usually flashes. For each of the buttons 2316 through 2319, terminal 2300 includes a lamp. Buttons 2316 and 2317 are for directory number DN1 and buttons 2318 and 2319 are for directory number DN15. Terminals may respond in a number of ways to the request for silent alerting. In a first method, the terminal flashes a light or indicator associated with the directory number but does not ring in response to the call. The first method is ambiguous when the terminal is off-hook since many terminals do not even ring for audible alerting calls when the terminal is off-hook. The first method is also ambiguous when the ringing mechanism on the terminal is turned off. A terminal using a second method similarly does not ring in response to a silent alerting call. However, in the second method, the terminal flashes the light or indicator associated with the directory number at a different rate for silent alerting calls than for audible alerting calls. Terminal 2300 flashes lamp 2313 120 times a minute for audible alerting calls and 30 times a minute for silent alerting calls. This allows the terminal user to distinguish a silent alerting call from an audible alerting call even when the terminal is off-hook or the ringing mechanism is turned off. In a third method, the terminal provides a busy indication for the directory number when requested to alert silently. This helps avoids confusion for the terminal user by indicating that a call cannot be originated using that directory number. Other responses than the three mentioned are also possible. Alternatively, no indication is provided at the terminal for silent alerting calls. In some implementations, the switching system may not even send messages to the terminal instructing the terminal to alert silently.

Figure 2:
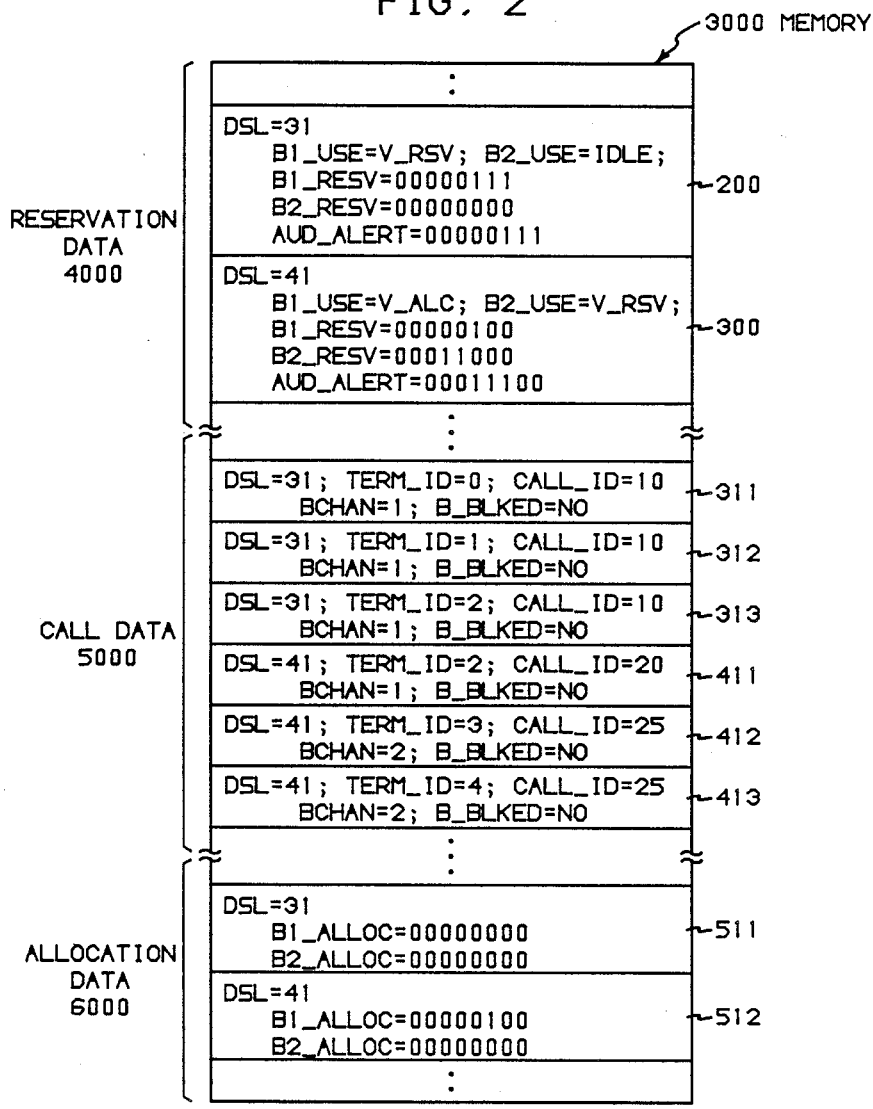
FIG. 2 shows a reservation and allocation related data stored in a control unit of the switching system of FIG. 1 defining B-channel reservations and allocations for digital subscriber lines of FIG. 1.
Figure 3:
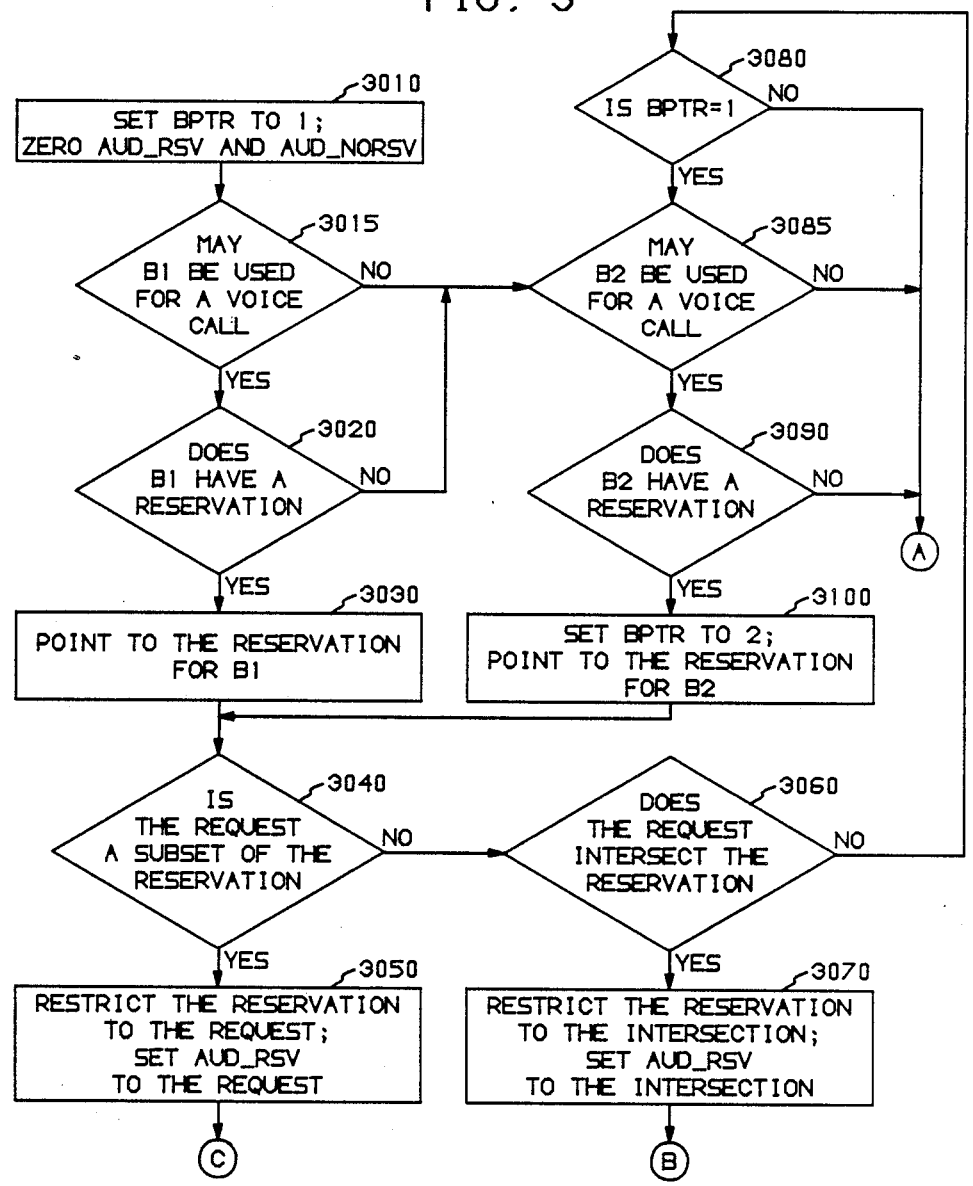
FIGS. 3 through 6 are flowcharts for a call processing program used in the system of FIG. 1 to determine B-channel reservations.

Switch 1000 maintains Reservation Data 4000 (FIG. 1) in memory 3000, which contains B-channel reservation data for digital subscriber lines 31 and 41. For each of the digital subscriber lines 31 and 41, three bit strings are stored in Reservation Data 4000. A first bit string, b1_resv, represents the reservations on B-channel B1 of the digital subscriber line. A second bit string, b2_resv, represents the reservations on B-channel B2 of the digital subscriber line. A third bit string, aud_alert, represents the terminals on the digital subscriber line that are alerting audibly. These three bit strings have a similar format. Each bit string includes a bit for each of the terminals on the digital subscriber line. Since switch 1000 provides for a maximum of eight terminals on a single digital subscriber line, each bit string has eight bits. Switch 1000 maintains data relating a unique one of the numbers zero through seven to each of the terminals on the digital subscriber line. The last digit of the label for a terminal in FIG. 1 is the identifier for that terminal on the digital subscriber line. For example, terminal 0 on digital subscriber line 31 is terminal 2300 and terminal 2 on digital subscriber line 41 is terminal 2402. The bits in each bit string correspond from right to left to terminals 0 through 7. For bit string b1_resv and bit string b2_resv, if a terminal is allocated a B-channel or has a reservation on a B-channel, the bit corresponding to that terminal is set in the bit string for that B-channel. For example, bit string b1_resv in block 200 (FIG. 2) has ones at bit position 0, 1, and 2 and zeros in all other positions. This indicates that terminals 0, 1, and 2 have reservations on B-channel B1 for digital subscriber line 31. If all the bits in a reservation bit string are set at zero, there is no reservation on the B-channel and the B-channel is not allocated to any terminal. For bit string aud_alert, if a bit corresponding to a terminal is set to one, this indicates that the terminal is currently alerting audibly.

For each digital subscriber line, data is also stored in Reservation Data 4000 for each B-channel indicating how the B-channel is being used. A first data item, b1_use, indicates how B-channel B1 is being used and a second data item, b2_use, indicates how B-channel B2 is being used. Possible values for b1_use and b2_use include IDLE, V_RSV, V_ALC, D_ALC, and PERM_PKT. A value of IDLE indicates that the B-channel is idle. A value of V_RSV indicates that the B-channel has been reserved in response to one or more voice calls. A value of V_ALC indicates that the B-channel has been allocated to a terminal for processing voice calls. A value of $D_{13}$ ALC indicates that the B-channel has been allocated to a terminal for processing data calls. A value of PERM_PKT indicates that the B-channel is being used for permanent packet service. For example, block 300 of Reservation Data 4000 (FIG. 2) contains data for digital subscriber line 41. Data item b1_use is set to V_ALC indicating that B-channel B1 is allocated to a terminal for voice calls and data item b2_use is set to V_RSV indicating that B-channel B2 is reserved.

When a B-channel is being used for a data call, a voice call cannot use the B-channel. Furthermore, a terminal user may specify that a particular B-channel is to be used only for data calls. Additional data is stored in the switch to specify any restrictions on the use of each B-channel. A terminal user may specify that a B-channel is to be used for permanent packet services. When this data specifies that a B-channel is to be used only for data calls or only for permanent packet service, that B-channel may not be used or reserved for a voice call.

Switch 1000 also maintains Call Data 5000 (FIG. 2) in memory 3000. For each of the terminals 2300 through 2302 on digital subscriber line 31 and the terminals 2400 through 2404 on digital subscriber line 41, data is stored in Call Data 5000 for each call that is active or alerting at the terminal. Each terminal and call pair is identified by the number from 0 to 7 that identifies the terminal and a call-id that identifies the call. Associated with each terminal and call pair are two data items. A first data item, bchan, identifies the B-channel, if any, that was reserved or allocated for the terminal in response to the call. If no B-channel was reserved, bchan is set to zero. Otherwise, bchan is set to one or two to indicate the reserved B-channel. A second data item, b_blked, indicates whether when a reservation was requested for the call, the terminal was B-channel blocked. For example, block 311 of Call Data 5000 (FIG. 2) contains data for a call at terminal 0 on digital subscriber line 31 identified by a call_id 10. The data item bchan is set to one. This indicates that B-channel B1 on digital subscriber line 31 was reserved for the call. In addition, the data item b_blked is set to NO to indicate that the terminal was not B-channel blocked when the reservation was requested.

Switch 1000 also maintains Allocation Data 6000 (FIG. 2) in memory 3000. For each digital subscriber line 31 and 41, the Allocation Data includes two bit strings, b1_alloc and b2_alloc. These bit strings have the same format as b1_resv and b2_resv in Reservation Data 4000. If a bit in the bit string is set to one, the B-channel has been allocated to the corresponding terminal on the digital subscriber line. Unlike b1_resv and b2_resv, at most one bit position will be set to one at any one time since a B-channel can only be allocated to one terminal at a time. When a B-channel is allocated to a terminal, the corresponding reservation bit string, b1_resv or b2_resv, is identical to the allocation bit string, b1_alloc or b2_alloc. In alternative embodiments, allocation data is eliminated. Instead, the switch simply uses the reservation bit strings in combination with the b1_use and b2_use data to determine whether the B-channel is allocated. If all bits in the allocation bit string are set to zero, the B-channel has not been allocated. For example, block 511 of Allocation Data 6000 (FIG. 2) contains data for B-channels B1 and B2 of digital subscriber line 31. Data items b1_alloc and b2_alloc are both set to "00000000," indicating that neither B-channel has been allocated to a terminal. Block 512 of Allocation Data 6000 contains data for B_channels B1 and B2 of digital subscriber line 41. Data item b1_alloc has the bit corresponding to terminal 2 set to one indicating that B-channel B1 is allocated to terminal 2. Data item b2_alloc is set to "00000000," indicating that B-channel B2 is not allocated to a terminal.

B-Channel Reservation

The reservation procedure discussed below is used for reserving B-channels for voice calls. The procedure insures that configurations having at least as many B-channels as terminals do not experience B-channel blocking when only voice calls are handled. For other configurations, the procedure insures that once a call is offered to a set of terminals on a digital subscriber line, at least one of the terminals will remain able to answer the call. A terminal is able to answer a call if a B-channel can be allocated to the terminal for use in answering a voice call. A call offered to a set of terminals becomes unanswerable if both B-channels are allocated or reserved for terminals not addressed by the call or if the B-channels are otherwise not available for processing voice calls. Advantageously, this procedure only reserves one B-channel on any one digital subscriber line in response to the call. Only one B-channel is required to answer the call and accordingly only one B-channel is reserved. The procedure does not tie up more resources than will possibly be used.

The reservation procedure depends on the ability of a terminal to place one voice call on hold and then answer another voice call using the same B-channel. Thus, if more than one call is offered to the same group of terminals, only one B-channel is reserved in response to the calls. Only the channel is needed because one terminal in the group of terminals can use the reserved B-channel to answer all the calls. Data calls cannot be put on hold. A similar reservation procedure modified not to depend on putting a call on hold could be used for data calls.

When an incoming call arrives at switch 1000 for a directory number, switch 1000 determines the set of terminals that share the directory number. Switch 1000 determines the digital subscriber lines for each of these terminals and attempts to reserve a B-channel on each of the determined digital subscriber lines. For each determined digital subscriber line, switch 1000 uses a bit string to define the terminals for which the reservation request is being made. The bit string has the same format as the bit strings b1_resv, b2_resv, and aud_alert. The eight bits of the bit string for the request correspond from right to left to the maximum eight terminals that may be located on the digital subscriber line. The bits corresponding to the terminals that share the called directory number are set to one. The remaining bits are set to zero. For each determined digital subscriber line, switch 1000 performs the reservation procedure illustrated by the flowcharts in FIGS. 3 through 6. The reservation procedure first attempts to satisfy the new request using an existing reservation to avoid having more than one B-channel reserved for any one terminal for voice calls. If the request cannot be satisfied using an existing reservation, the procedure attempts to reserve an unreserved B-channel to satisfy the request.

Execution begins at block 3010 (FIG. 3) where switch 1000 initializes a local variable bptr, which is used to identify the B-channel being examined, to one. The illustrative embodiment defined by the flowchart of FIG. 3 first determines whether a reservation could be obtained on B-channel B1. An alternative procedure may be used that first determines whether a reservation could be obtained on a B-channel indicated as preferred by the terminals to which a call is being offered. One way that the preference may be indicated is by preference data stored in the switch on either a terminal, digital subscriber line, or directory number basis. For example, a data item could be included in Reservation Data 4000 for each digital subscriber line indicating the preferred B-channel for that digital subscriber line.

In addition to initializing bptr, switch 1000 initializes aud_rsv, an eight-bit string which is used to identify the terminals for which a reservation has been granted in response to the request. Switch 1000 also initializes aud_norsv, a eight-bit string which is used to identify the terminals in the request for the which a reservation has not been granted but that should alert audibly. Bptr, aud_rsv, and aud_norsv are local variables that are used to temporarily store data during the reservation procedure. Processing continues with block 3015 where switch 1000 determines if B-channel B1 may be used for a voice call. If data in switch 1000 defines B-channel B1 as available only for data calls, the B-channel may not be used for a voice call. Also if the data item b1_use in Reservation Data 4000 defines the B-channel as currently used for a data call, the B-channel may not be used for a voice call. If B-channel B1 may not be used for a voice call, processing continues with block 3085. Otherwise, processing continues with block 3020 where switch 1000 checks whether there is a reservation on B-channel B1. When the B-channel reservation bit string for B1, b1_resv, is equal to zero, there are no reservations for the B-channel and processing continues with block 3085.

Figure 6:
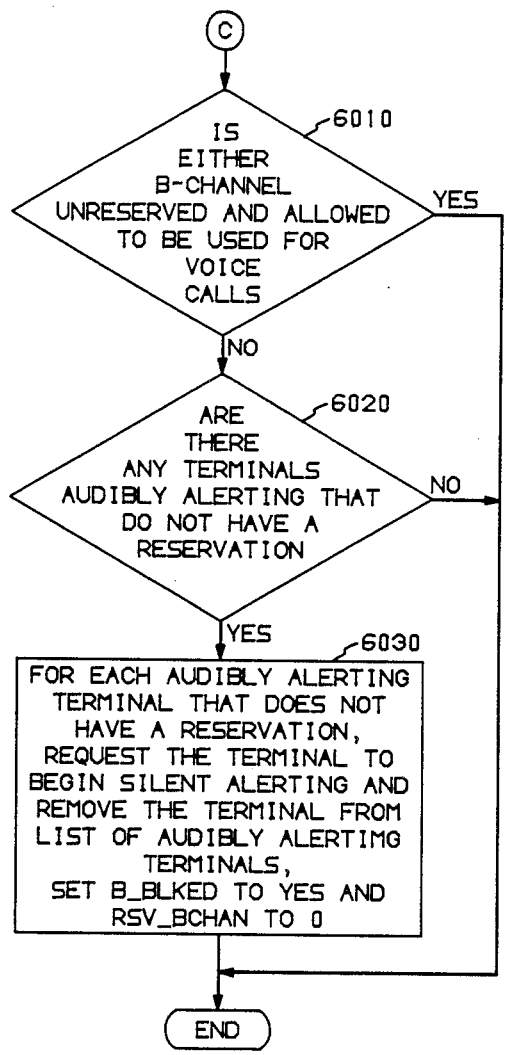

If there is a reservation on B-channel B1, processing continues with block 3030. At block 3030, switch 1000 points to the reservation bit string for B-channel B1, b1_resv. Checks are made in the blocks following block 3030 to determine whether the reservation includes any of the terminals in the request. At block 3040, switch 1000 determines whether the request is a subset of the reservation for B-channel B1. Switch 1000 makes this check by performing an OR operation on the bit string representing the reservation for B-channel B1 with the bit string representing the request. If the result of the OR operation is equal to the bit string for the reservation for B-channel B1, the request is a subset of the reservation. If the request is a subset of the reservation, execution proceeds to block 3050. At block 3050, the reservation for B-channel B1 is restricted to only those terminals for which the request is being made by assigning the bit string for the request to the bit string for the reservation. Note that the intersection of the request and the existing reservation is equivalent to the request since the request is a subset of the existing reservation. The bit string aud_rsv is also assigned the bit string for the request. All terminals in the request are granted a reservation so aud_norsv remains all zeros. Execution continues with block 6010 (FIG. 6). When the request is a subset of an existing reservation but is not equivalent to the existing reservation, some terminals that had a reservation will lose the reservation when the existing reservation is replaced by the request. These terminals will be alerting without a reservation. At block 6010, as described in more detail below, a check is made to determine whether any terminals that are alerting without a reservation may continue to alert.

If the result of the check in block 3040 (FIG. 3) was negative, execution proceeds with block 3060 where a check is made whether the request intersects the B-channel B1 reservation. This is determined by performing an AND operation on the bit string for the request and the bit string for the existing reservation and checcking if the result is a value other than zero. If the request intersects the B-channel B1 reservation, processing continues with block 3070. At block 3070, a reservation is granted only to those terminals in the intersection. The B-channel B1 reservation is changed to include only those terminals. This is done by setting the bit string for the B-channel B1 reservation to the result of the AND operation. There are two possible cases. The request may be a superset of the existing reservation or the request may intersect the reservation without being a superset. When the request is a superset of the existing reservation, setting the reservation to the intersection of the request and the reservation does not change the reservation. If the request intersects but is not a superset of the existing reservation, some terminals in the existing reservation will lose their reservation. A check beginning at block 6010 will determine if these terminals may continue to alert audibly. At block 3070, aud_rsv is also set equal to the intersection of the request and the reservation.

Figure 5:
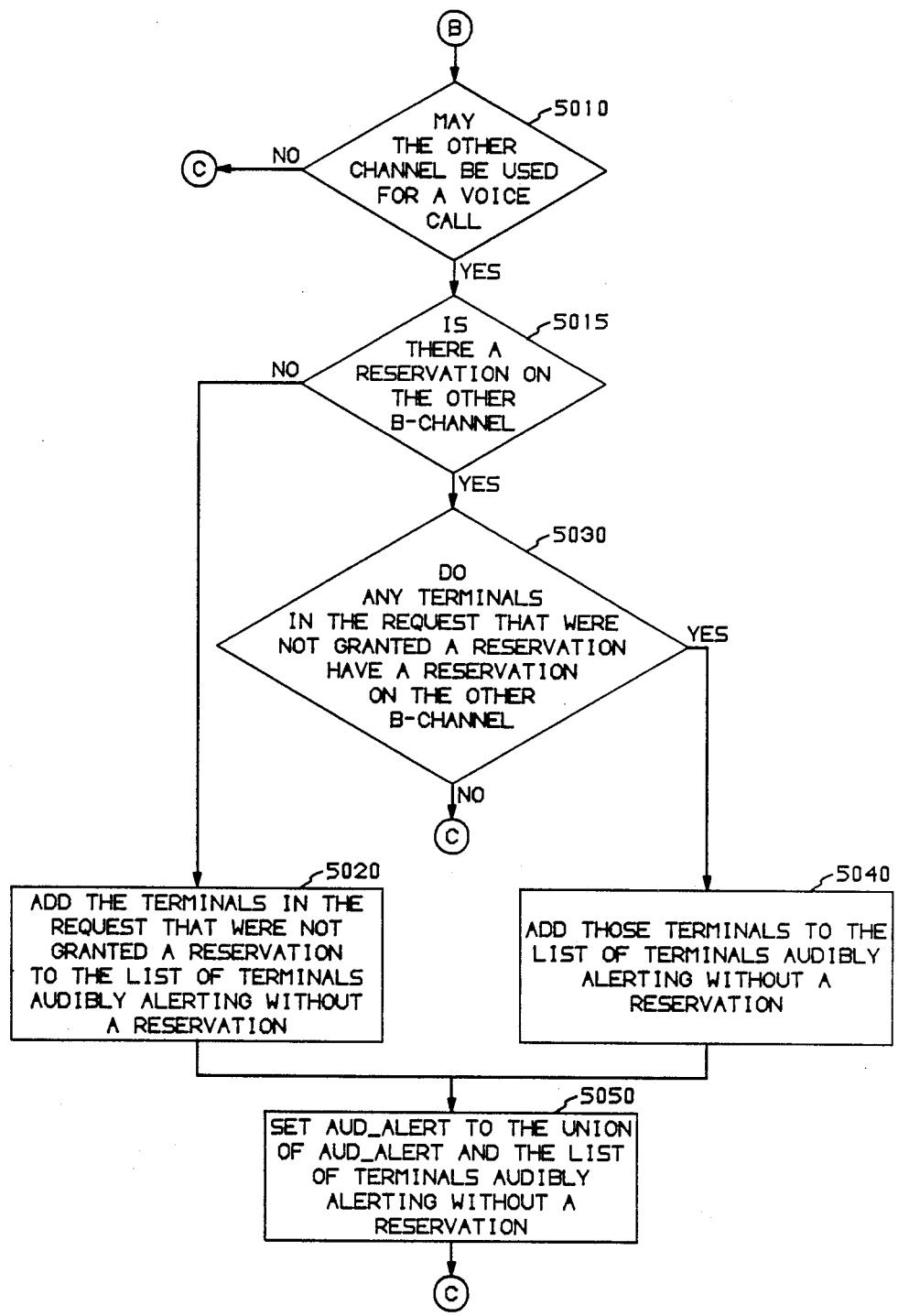

Note that new values for the B-channel B1 reservation bit string and the aud_rsv bit string are established in the same way for this intersection case at block 3070 as in block 3050 for the case in which the request is a subset of the reservation. In all cases when an existing reservation is modified to satisfy an new request, the new reservation is the intersection of the existing reservation and the request. A difference between the subset case and the intersection case is that when the request is not a subset of the reservation some of the terminals in the request will not be granted a reservation. Additional processing is required to determine whether those terminals should audibly or silently alert in response to the call. After completing processing at block 3070, processing continues with block 5010 (FIG. 5). At block 5010, as described in more detail below, the check is made to determine if the terminals in the request that were not granted a reservation should alert audibly or silently. At that point, aud_norsv is set.

Figure 4:
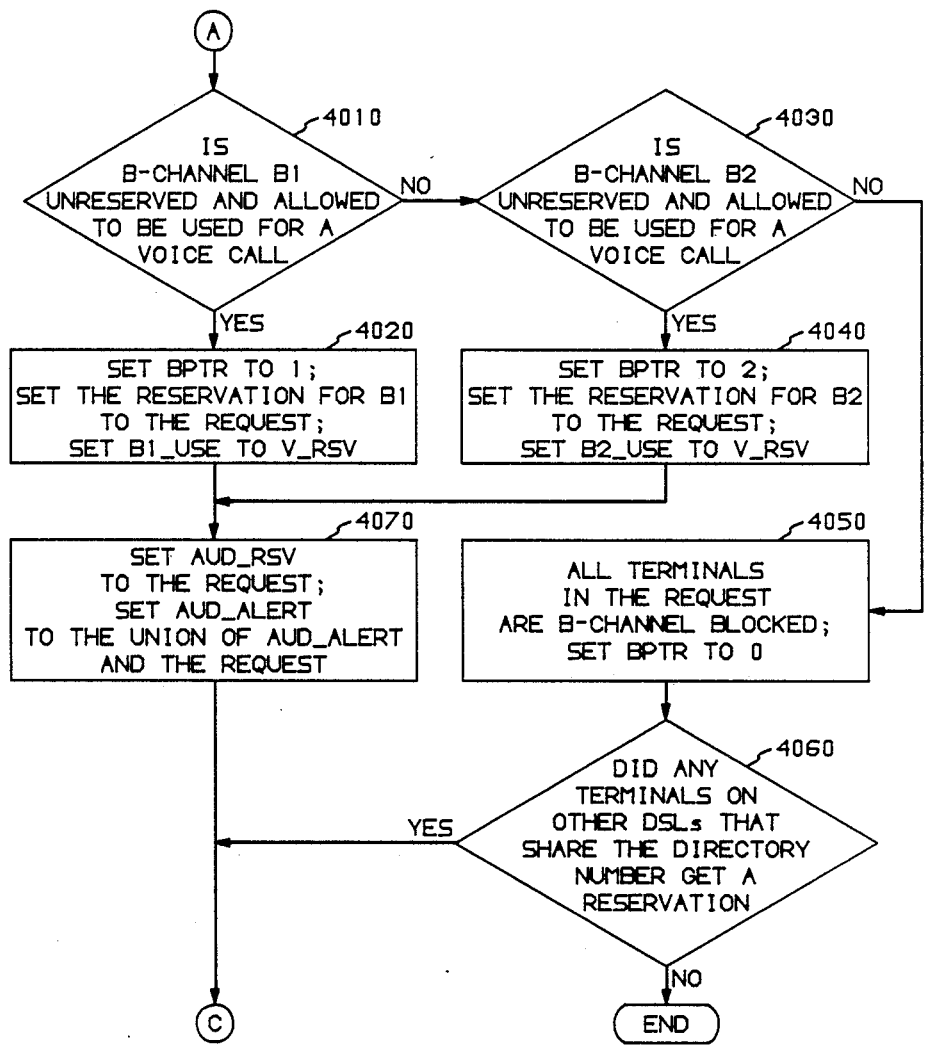

If the check in block 3060 indicated that the request and the existing reservations do not intersect, processing continues with block 3080. At block 3080, a check is made whether both B-channels have been checked. The check is performed by determining whether the variable bptr is still equal to one indicating that only the first B-channel has been checked. If bptr is not equal to one, reservations for both B-channels have been checked and processing continues with block 4010 (FIG. 4).

If bptr is equal to one, processing continues with block 3085. Block 3085 is reached when none of the terminals in the request are in the existing reservation on B-Channel B1, including the cases in which there is no reservation on B-channel B1 and in which B-Channel B1 is not available for voice calls. At block 3085, switch 1000 checks if B-channel B2 may be used for a voice call. If B-channel B2 may not be used for a voice call, processing continues with block 4010. Otherwise, processing continues with block 3090 where a check is made whether there is a reservation for B-channel B2. If there is no reservation on B-channel B2, processing continues with block 4010. If there is a reservation on B-channel B2, processing continues with block 3100. At block 3100, switch 1000 points to the reservation data for B-channel B2. In addition, the variable bptr is set to two. Next, the procedure discussed above for the B-channel B1 reservation is repeated for the B-channel B2 reservation. The procedure to be repeated begins at block 3040.

Block 4010 (FIG. 4) is reached when none of the terminals in the request have a reservation on B-channel B1 or B2. Beginning at block 4010, an attempt is made to reserve an unreserved B-channel to satisfy the request. The B-channel must not be reserved or allocated and must be available for voice calls. At block 4010, a check is made whether B-channel B1 is unreserved and available for voice calls. If the result of the check at block 400 is positive, processing continues with block 4020. At block 4020, the variable bptr is set to one to identify B-channel B1 as the B-channel being examined. A reservation is granted on B-channel B1 for all the terminals in the request by setting bit string b1_resv to the request bit string, and processing continues with block 4070. Otherwise, if B-channel B1 is reserved or not available for voice calls, processing continues with block 4030 where a check is made whether B-channel B2 is unreserved and available for voice calls. If the result of this check is positive, processing continues with block 4040. At block 4040, the variable bptr is set to two to identify B-channel B2 as the channel being examined. A reservation is granted on B-channel B2 for the terminals in the request by setting bit string b2_resv to the request bit string, and processing continues with block 4070. If no reservation was granted, processing continues with block 4050 where the variable bptr is set to zero to indicate the no B-channel could be reserved in response to the request.

If block 4050 is reached, all terminals addressed by the call on this digital subscriber line are B-channel blocked and unable to answer the call. If the switch determines that at least one terminal on another digital subscriber line is not B-channel blocked and will be allowed to alert audibly in response to the call, processing continues with block 6010 (FIG. 6). Switch 1000 will send SETUP messages to all the terminals that share the called directory number instructing the terminals to alert silently. These terminals cannot answer the call because they are B-channel blocked. If after examining all the digital subscriber lines attached to terminals that share the called directory number switch 1000 determines that none of the terminals will be allowed to alert audibly in response to the call, all terminals are B-channel blocked, the call cannot be offered, and processing ends. When the call cannot be offered because all terminals addressed by the call are B-channel blocked, switch 1000 returns an indication to the calling party that all terminals are B-channel blocked. As a result of this indication, the calling party receives a busy tone, some other congestion tone, or a special announcement depending on the capabilities of the switching system serving the calling party.

At block 4070, which is reached when a new reservation is made for the request on a previously unreserved B-channel, the bit string representing the terminals that have a reservation and are to alert audibly for the call, aud_rsv, is set to the request. In addition at block 4070, the bit string aud_alert stored in reservation data 4000 for the digital subscriber line is set to the union of the previous contents of the bit string aud_alert with the bit string for the request. This indicates that all terminals that previously were alerting audibly plus the terminals in the request are alerting audibly. Processing continues with block 6010.

Block 5010 (FIG. 5) is reached when the request intersects the reservation but the request is not a subset of the reservation. A check is made whether the terminals in the request that were not granted a reservation should alert audibly or silently. The terminals in the request that were not granted a reservation audibly alert if they have a reservation on the B-channel or if the other B-channel is unreserved and usable for voice calls. Otherwise, the terminals that were not granted a reservation are considered B-channel blocked and the terminals will be requested to alert silently. The other B-channel is the B-channel other than the B-channel on which a reservation was granted in response to the call. The variable bptr identifies the B-channel on which a reservation was granted. First, at block 5010, a check is made whether the other B-channel may be used for a voice call. If the other B-channel may not be used for a voice call, processing continues with block 6010. If the other B-channel may be used for a voice call, processing continues with block 5015 where a check is made whether there is a reservation for the other B-channel. This check is made by determining if the reservation data for the other B-channel is equal to zero. If there is no reservation, processing continues with block 5020. At block 5020, the bits corresponding to the terminals in the request that were not granted a reservation are set to one in the local variable aud_norsv and processing continues with block 5050. This indicates that these terminals should alert audibly in response to the call even though they do not have a B-channel reservation.

If there is a reservation for the other B-channel, processing continues with block 5030 where a check is made whether any of the terminals in the request that were not granted a reservation have a reservation on the other B-channel. If any of the terminals have a reservation on the other B-channel, those terminals may also alert audibly. If the terminals in that request that were not granted a reservation do not have reservations processing continues with block 6010 (FIG. 6).

If any of the terminals have a reservation on the other B-channel, processing continues with block 5040 where the bits corresponding to these terminals in the bit string aud_norsv are set to one. Note that bits are set in aud_norsv rather than aud_rsv. These local variables only indicate whether a reservation was granted for a terminal in response to this request. In this case, a reservation was not granted in response to the reservation request so aud_norsv is set. Processing continues with block 5050.

At block 5050, the set of terminals audibly alerting on the ditigal subscriber line is updated. The set of audibly alerting terminals, defined by the bit string aud—alert, is set to the union of the previous set of audibly alerting terminals and the set of terminals audibly alerting without a reservation, defined by the bit string aud—norsv. Processing continues from block 5050 with block 6010.

Granting a new reservation request may cause terminals that are already audibly alerting to become B-channel blocked. For example, some terminals may have been audibly alerting in response to a call but may not have had a reservation. These terminals were allowed to audibly alert because one of the B-channels was idle. However, if that B-channel becomes reserved, the alerting terminals become B-channel blocked unless they have a reservation. Beginning at block 6010 (FIG. 6), a check is made comparing the list of terminals that are alertiing audibly on the digital subscriber line with the reservation data for B-channels B1 and B2. If there are reservations on both B1 and B2, then only those terminals with reservations should be in the list of audibly alerting terminals since a B-channel could be allocated to only those terminals. The procedure defined by the flowchart in FIG. 6 is executed not only when a request for a new reservation has been made but also when a terminal on the digital subscriber line answers or originates a call. This procedure cleans up after changes have been made to the reservations for the B-channels. Because of reservation changes, terminals that were audibly alerting may now be B-channel blocked. At block 6010, a check is made whether either B-channel is unreserved and available for voice calls. This is determined by checking whether either bit string b1—resv of b2—resv is equal to zero indicating that the B-channel is not reserved. If one of the bit strings is equal zero, a check is made that the B-channel may be used for voice calls. If at least one of the B-channels is unreserved and may be used for voice calls, even terminals without reservations may alert audibly so processing is complete. If both B-channel B1 and B2 have reservations, processing continues with block 6020, where a check is made whether any terminals are in the list of audibly alerting terminals but are not in a reservation for either B-channel B1 or B2. If no such terminals exist, processing is complete. If there are terminals in the list of audibly alerting terminals that do not have a reservation, processing continues with block 6030, where switch 1000 sends INFO messages to those terminals to instruct them to begin silent alerting. Those terminals were part of a reservation that was restricted to accommodate a new reservation or those terminals shared a reservation with a terminal that used the reserved B-channel to originate or terminate a call. Note that no terminals have started to alert yet in response to the call for which the reservation is being made. At block 6030, switch 1000 also updates the call data for these terminals by setting the b—blked data item corresponding to each of these terminal to "YES" and the bchan for each of these terminals to "0". In addition, at block 6030, switch 1000 removes these terminals from the list of audibly alerting terminals and processing is then complete. These terminals are now B-channel blocked.

After switch 1000 has completed the reservation procedure for all digital subscriber lines for terminals sharing the called directory number, switch 1000 has a list of the terminals that will alert audibly in response to the call. These terminals are represented by the bit strings aud—rsv and aud—norsv for each digital subscriber line. Switch 1000 sends SETUP messages to all terminals defined by either aud—rsv or aud—norsv offering the incoming call to the terminals and instructing the terminals to alert audibly. For each of these terminals, switch 1000 stores data in Call Data 5000 identifying the B-channel, if any, that was reserved for the terminal in response to the call, and indicating whether the terminal is B-channel blocked. The terminal is identified by a number from zero to seven and the call is identified by a string call—id. For each terminal in aud—rsv, switch 1000 creates a terminal and call pair and sets the data item bchan to the B-channel, either one or two, that was reserved for the terminal in response to the call and sets the data item b—blked to NO. For each terminal in aud—norsv, switch 1000 creates a terminal and call pair and sets the data item bchan to zero and sets the data item b—blked to NO, indicating that no B-channel was reserved but that the terminal was not B-channel blocked. For any other terminals that share the called directory number but are not included in the list of terminals that were granted a reservation (aud—rsv) or the list of terminals that were not granted a reservation but that are to alert audibly (aud—norsv), switch 1000 sends a SETUP message instructing the terminals to alert silently. These terminals silently alert but cannot answer the call because they are B-channel blocked. For each of these terminals, switch 1000 creates a terminal and call pair and sets the data item bchan to zero and sets the data item b—blked to YES, indicating that no B-channel was reserved and that the terminals were B-channel blocked.

A first example shows how an existing reservation may be restricted and what happens to any terminals that have a lost a reservation because of the restriction. Note that although some terminals may lose a reservation, all of the calls being offered on each digital subscriber line remain answerable by at least one of the terminals sharing the digital subscriber line. In this example, a call arrives for directory number DN7. Switch 1000 determines from directory number data stored in switch 1000 that directory number DN7 is shared by terminals 1 and 2 on digital subscriber line 31. Assume that the reservation data for digital subscriber line 31 is as shown in block 200 of FIG. 2. There is a reservation for a voice call on B-channel B1 for terminals, 0, 1, and 2. These terminals are currently audibly alerting in response to a call to directory number DN1, which the three terminals share. Switch 1000 initializes a bit string for the request to "00000110" to define the terminals that share directory number DN7 and uses the B-channel reservation procedure discussed above to reserve a B-channel in response to the incoming call to DN7.

Figure 7:
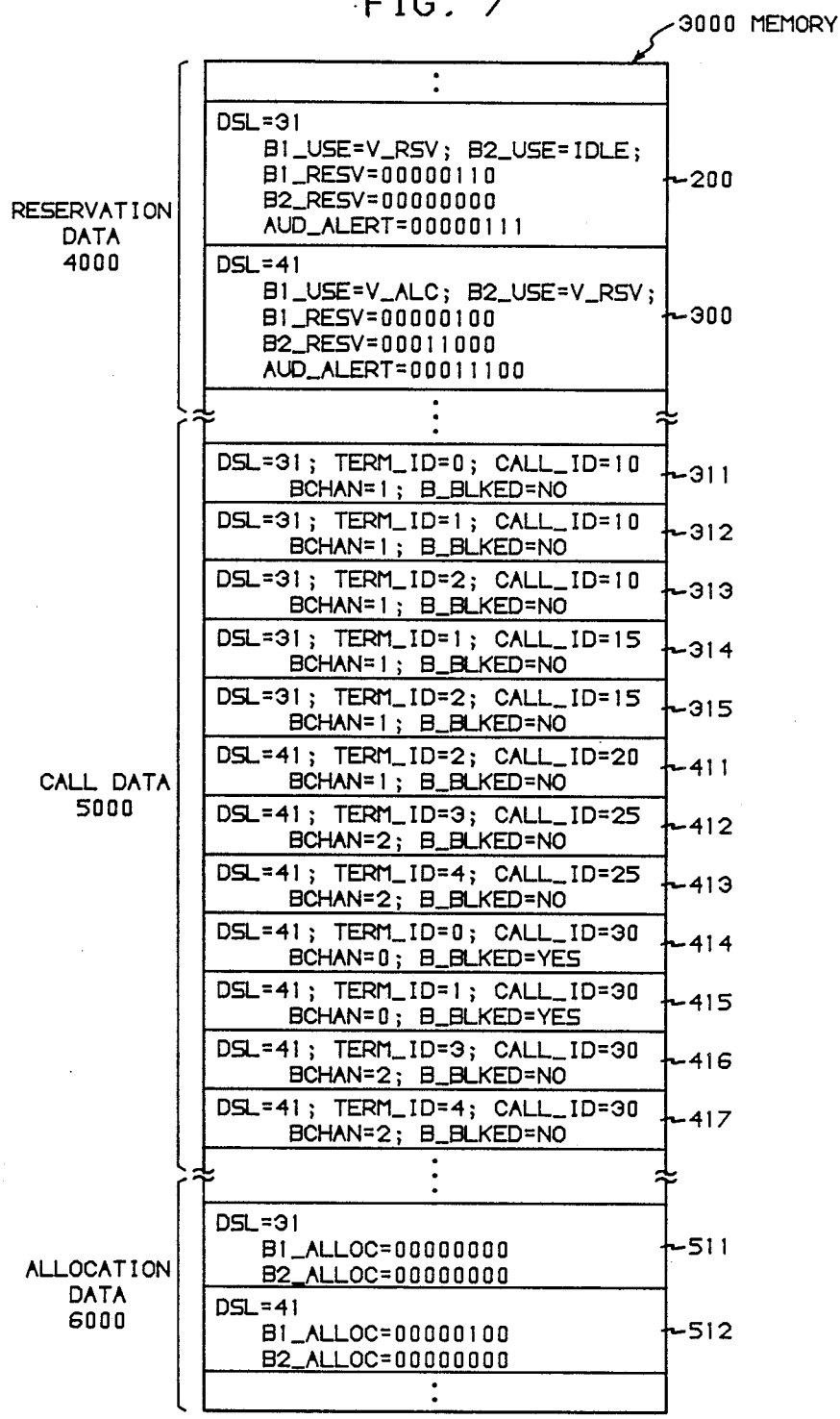
FIG. 7 shows reservation and allocation related data stored in a control unit of the switching system of FIG. 1 defining B-channel reservations and allocations for digital subscriber lines of FIG. 1.

Switch 1000 initializes the variable bptr to one and zeros the bit strings aud—rsv and aud—norsv (flowchart block 3010). Switch 1000 determines that B-channel B1 may be used for a voice call (flowchart block 3015). Switch 1000 determines that there is a reservation for B-channel B1 (flowchart block 3020) and points to the B-channel reservation data, b1—resv, for digital subscriber line 31 (flowchart block 3030). Switch 1000 determines if the request is a subset of the reservation for B-channel B1 (flowchart block 3040). In this example, the request is a subset of the reservation so switch 1000 sets both b1—resv and aud—rsv to the request (flowchart block 3050). Thus, b1—resv, which was set to "00000111" is now set to "00000110." Terminal 0 no longer has a reservation on the B-channel. The reservation status of the other B-channel must be examined to determine whether terminal 0 could still answer the incoming call to directory number DN or whether terminal O is now B-channel blocked. Next, switch 1000 checks if either B-channel is unreserved and allowed to be used for voice calls (flowchart block 6010 FIG. 6). Switch 1000 determines that b2_resv is equal to zero and therefore B-channel B2 is not reserved. B-channel B2 is also allowed to be used for voice calls and therefore switch 1000 determines terminal 0 may continue to alert audibly. Thus, the reservation procedure is complete. Switch 1000 sends SETUP messages to the terminals identified by the bit string aud_rsv, terminals 2 and 3, offering the call for directory number DN7 and instructing the terminals to alert audibly. FIG. 7 shows the contents of Reservation Data 4000 and Call Data 5000 for digital subscriber line 31 after this example.

A second example shows how an existing reservation may be used to partially satisfy a request. Again, note that all of the calls that are offered on a digital subscriber line remain answerable by at least one of the terminals sharing the digital subscriber line. In this example, a call arrives for directory number DN9. Switch 1000 determines from directory number data stored in switch 1000 that directory number DN9 is shared by terminals 0, 1, 3 and 4 on digital subscriber line 41. Assume that the reservation data for digital subscriber line 41 is as shown in block 300 of FIG. 2. This data indicates that terminal 2 has a reservation on B-channel B1 and terminals 3 and 4 have reservations on B-channel B2. Switch 1000 initializes a bit string for the request to "00011011" to define the terminals that share directory number DN9 and uses the B-channel reservation procedure discussed above to reserve a B-channel in response to the incoming call to DN9.

Switch 1000 initializes the variable bptr to one and zeros the bits strings aud_rsv and aud_norsv (flowchart block 3010). Switch 1000 determines that there is a reservation for B-channel B1 (flowchart block 3020) and points to the B-channel reservation data, b1_resv, for digital subscriber line 41 (flowchart block 3030). Switch 1000 determines if the request is a subset of the reservation for B-channel B1 (flowchart block 3040). In this case the request is not a subset of the reservation for B-channel B1, so switch 1000 checks if the request intersects the reservation for B-channel-B1 (flowchart block 3060). The request does not intersect the reservation.

Switch 1000 determines that bptr is equal to one (flowchart block 3080) and checks if B-channel B2 has a reservation (flowchart block 3080). B-channel B2 has a reservation and switch 1000 sets bptr to two and points to the reservation for B-channel B2 (flowchart block 3100). Switch 1000 checks if the request is a subset of the reservation for B-channel B2 (flowchart block 3040). The request is not a subset of the reservation. Switch 1000 determines if the request intersects the reservation (flowchart block 3060). The request intersects the reservation so switch 1000 restricts the reservation to the intersection of the request and the reservation (flowchart block 3070). Terminals 3 and 4 are in the intersection of the request. Thus, the reservation is changed to only include terminals 3 and 4. Bit string b2_resv is set to "00011000." Switch 1000 also sets aud_rsv to the intersection of the request and the reservation (flowchart block 3070).

Next, switch 1000 determines if there is a reservation on the other B-channel, B-channel B1 (flowchart block 5010). B-channel B1 has a reservation so switch 1000 determines if any terminals in the request that were not granted a reservation, terminals 0 and 1, have a reservation on the other B-channel (flowchart block 5030). These terminals do not have a reservation. Next, switch 1000 checks for any terminals that do not have a reservation and are audibly alerting (flowchart blocks 6010 and 6020). There are no terminals audibly alerting without reservations so the reservation procedure is complete.

Switch 1000 sends SETUP messages to terminals 3 and 4, offering the call to the terminals and instructing the terminals to alert audibly. Switch 1000 creates call data for the call for both terminal 3 and 4. The call-id is 30. Switch 1000 sets bchan in the call data for each terminal to two and sets b_blked to NO. Switch 1000 also sends SETUP messages to terminals 0 and 1, instructing the terminals to alert silently in response to the call. These terminals are B-channel blocked and cannot answer the call. Switch 1000 creates call data for the call for both terminal 0 and 1. Switch 1000 sets bchan in the call data for each terminal to zero and sets b_blked to YES. FIG. 7 shows the contents of Reservation Data 4000 and Call Data 5000 after this example.

When a terminal on the digital subscriber line answers an incoming call or originates a new call, the reservation for the B-channel used for the call is changed to include only that terminal. The B-channel is allocated to the terminal for the duration of the call. Switch 1000 sets the bit position for the terminal to one in the appropriate allocation bit string, b1_alloc or b2_alloc, in the data block in Allocation Data 6000 (FIG. 2) to identify the terminal for which the B-channel was allocated. The B-channel previously was either reserved or free. Switch 1000 checks if any terminals that shared the reservation or have been allowed to alert audibly because an unreserved B-channel existed have become B-channel blocked. This check is made using the procedure illustrated by the flowchart of FIG. 6. This procedure has been discussed above.

Switch 1000 removes reservations when a calling party abandons a call to a directory number before answer and whenever a terminal answers an incoming call to a directory number. In these cases, switch 1000 must remove the reservations on all digital subscriber lines having terminals that share the directory number. Switch 1000 also removes reservations when a terminal on the digital subscriber line disconnects from a call. In this case, switch 1000 only needs to remove the reservation on the digital subscriber line associated with the disconnected call.

Since a reservation on a B-channel may have been created in response to several calls, switch 1000 first checks for any other calls that need the reservation before removing the reservation. To do this, switch 1000 selects a terminal for which call data indicating that a B-channel was reserved for the disconnected call is stored and for which the indicated B-channel is still reserved. If other calls than the disconnected call required the B-channel reservation, data for those other calls will have been stored for the selected terminal. A B-channel reservation represents the intersection of the requests for all calls that require the B-channel reservation. Switch 1000 accesses the call data for the selected terminal and checks for calls other than the disconnected call that have bchan set to the B-channel reserved for the disconnected call and b_blked set to NO. If such call data exist, the reservation must be preserved. Otherwise, the reservation is zeroed and the B-channel is free. When the reservation is removed the terminals are also removed from the set of audibly alerting terminals, designated by aud—alert in Reservation Data 4000.

For example, assume the call to directory number DN1, mentioned in the first example above, terminated when the calling party abandoned the call. This call is identified by call—id 10. FIG. 7 shows the contents of Reservation Data 4000 and Call Data 5000 after the two examples discussed above. First, switch 1000 selects a terminal for which Call Data 5000 indicates a B-channel was reserved and for which the indicated B-channel is still reserved. Switch 1000 accesses the call data for the call at terminal 0. The data indicates that B-channel B1 was reserved. However, the bit string b1—resv for digital subscriber line 31 in Reservation Data 4000 indicates that B-channel B1 is currently reserved only for terminal 1 and 2. Next, switch 1000 accesses the call data for the call at terminal 1. The data indicates that B-channel B1 was reserved and the bit string b1—resv for digital subscriber line 31 indicates that B-channel B1 is still reserved for terminal 1. Switch 1000 searches the list of call data for terminal 1. Switch 1000 locates call data stored at block 314 (FIG. 7) of Call Data 5000 indicating that B-channel B1 is also reserved for a call identified by call—id 15 at terminal 1. Thus, switch 1000 preserves the B-channel reservation.

Consider another example in which a call identified by a call—id 20 on digital subscriber line 41 terminates after the calling party abandoned the call. This call was to a directory number for terminal 2 on digital subscriber line 41. Switch 1000 locates call data stored at block 411 of Call Data 5000 (FIG. 7) for the call. This call data is for terminal 2 and indicates that B-channel B1 was reserved for the call. The bit string b1—resv for digital subscriber line 41 indicates that B-channel B1 is still reserved for terminal 2. Switch 1000 searches the call data stored for terminal 2. However, the only data stored is for the call that has terminated. Thus, there are no other calls that require the reservation and switch 1000 removes the reservation by setting b1—resv for digital subscriber line 41 to "00000000."

The illustrative embodiment shown by the flowcharts in FIGS. 3 through 6 sometimes results in a terminal beginning to alert audibly and then being requested to change to silent alerting. This occurs either because the terminal's reservation was removed because reservation was restricted to only a subset of the original reservation or because the terminal was audibly alerting without having a reservation. Several alternative embodiments avoid or completely eliminate any change from audible to silent alerting. One way of limiting the times that this occurs is to only allow terminals with reservations to audibly alert. This significantly simplifies the process shown in FIG. 3 through 6. This completely eliminates the steps shown by FIG. 5. Instead of continuing from block 3070 to block 5010, processing continues with block 6010.

In another illustrative embodiment, the probability of changing from audible to silent alerting is decreased by never permitting a new reservation to restrict an existing reservation. An existing reservation is used to satisfy a new reservation request only if the request includes all the terminals in the existing reservation. In other words, terminals are never removed from the reservation until one of the terminals is allocated the reserved B-channel.

If these two methods for limiting the switch from audible to silent alerting are combined, the cases in which a terminal switch from audible to silent alerting are limited to cases in which multiple calls create a reservation for more than one terminal. Assume one of the terminals in the reservation answers one of the calls. Since only one of the calls has been answered, the terminals are still alerting in response to the other calls. The other terminals that were included in the reservation may become B-channel blocked and change from audible alerting to silent alerting. Any switch from audible alerting to silent alerting is avoided by using the two methods discussed above and only granting new reservations based on existing reservations when the existing reservation contains just one terminal. Once this terminal has a reservation, it will not become B-channel blocked. If it answers one of the calls, it can always place that call on hold and use the same B-channel to answer the other calls. This change eliminates the need for the processing defined by the flowchart of FIG. 6.

The illustrative embodiment shown by the flowcharts in FIG. 3 through 6, only reserves one B-channel in response to a reservation request. If all the terminals for which the reservation is requested did not obtain a reservation, a determination is made based on the status of the other B-channel whether these terminals should audibly alert, however, no additional reservation is made for these terminals. In an alternative embodiment, a reservation could be made for these terminals on the other B-channel if the other B-channel was not reserved.

The illustrative embodiment shown by the flowcharts in FIG. 3 through 6 reserves a specific B-channel for a particular set of terminals. An alternative illustrative embodiment does not specifically reserve B-channels for particular sets of terminals but instead maintains a list of terminals on a digital subscriber line that are allowed to use a B-channel on that digital subscriber line to answer or originate a call. Alternatively, a list of those terminals prohibited from using a B-channel could be maintained. A list of terminals allowed to use or prohibited from using a B-channel is not even required if the list of terminals is redetermined each time a new call is offered or a request for a B-channel is made. Each time a B-channel for the digital subscriber line is allocated or deallocated or a new incoming call is to be offered on the digital subscriber line, the set of terminals allowed to use a B-channel is redetermined. A terminal is not allowed to use a B-channel if that use would prevent at least one of the calls currently offered on the digital subscriber line from being answered.

For example, assume three calls are being offered on digital subscriber line 31. One of the calls is to directory number DN1 and terminals 2300, 2301, and 2302 are audibly alerting in response to that call. Another call is to directory number DN7 and terminals 2301 and 2302 are audibly alerting in response to that call. Another call is to directory number DN15 and terminal 2300 is audibly alerting in response to that call. At this point, all terminals are permitted to use a B-channel to answer or originate a call. If a B-channel is allocated to terminal 2300, terminal 2300 can answer the call to directory number DN1 and directory number DN15 using that B-channel and terminal 2301 or terminal 2302 could use the other B-channel to answer the call to directory number DN7. Likewise, if a B-channel is allocated to either terminal 2301 or 2302, that terminal could use the allocated B-channel to answer the calls to directory numbers DN1 and DN7 and terminal 2300 could use the other B-channel to answer the call to directory number DN15. Thus, allocating a B-channel to any one of the terminals at this point does not prevent any of the alerting calls from being answered. However, assume that terminal 2302 answers the call for directory number DN1. When a B-channel is allocated to terminal 2302 for answering the call, switch 1000 redetermines the set of terminals that are allowed to use B-channels. Terminal 2302 is answering the call to directory number DN1 and can answer the call to directory number DN7 by putting the other call on hold. This leaves the call to directory number DN15 to be answered. Allocating the other B-channel to terminal 2301 would prevent the call to directory number DN15 from being answered since terminal 2300 is the only terminal that can answer that call and terminal 2300 would be unable to obtain a B-channel. Thus, terminal 2301 is not allowed to use a B-channel and terminal 2300 is the only terminal that is not currently allocated a B-channel that is allowed to use a B-channel.

The reservation schemes detailed above result in an incoming call being offered if at least one terminal in the group of terminals sharing the directory number is not B-channel blocked and is able to alert audibly in response to the call. In an alternative arrangement, one of the terminals in the group of terminals sharing the directory number may be identified as a lead terminal for that group of terminals. The terminal identified as the lead terminal has a special status within the group of terminals sharing the directory number. In such an arrangement, the procedure may be modified so that the call is not offered when the terminal identified as the lead terminal is B-channel blocked. When the lead terminal is B-channel blocked, an indication would be returned to the calling party resulting in the calling party receiving a busy or congestion tone, or a special announcement.

B-CHANNEL ALLOCATION AND REALLOCATION

Switch 1000 may allocate a B-channel rather than merely reserve a B-channel for one of the terminals sharing the directory number at the time the call is offered. This decreases the set-up time required if the terminal allocated the B-channel subsequently answers the call. Allocating a B-channel to a terminal for a call establishes connections in switch 1000 to allow access to the B-channel and defines the B-channel as being used only by the terminal to which it is allocated. Establishing connections in switch 1000 includes setting up a path for the call through switching network 1010 to the digital subscriber line to which the terminal is connected. In contrast, reserving a channel for a group of terminals indicates only that one of the group of terminals is entitled to be allocated a channel. When a B-channel is merely reserved no path is set up for the call through switching network 1010 to a digital subscriber line. When a B-channel is reserved for a group of terminals and one of the terminals attempts to answer or originate a call, the reserved B-channel is allocated for the terminal and the path set-up is performed at that time. Answer delay is increased by performing the path set-up when the call is answered. Allocating a B-channel to a terminal before the terminal attempts to answer a call includes performing the path set-up and thus decreases the call set-up time required when the terminal answers the call.

Figure 8:
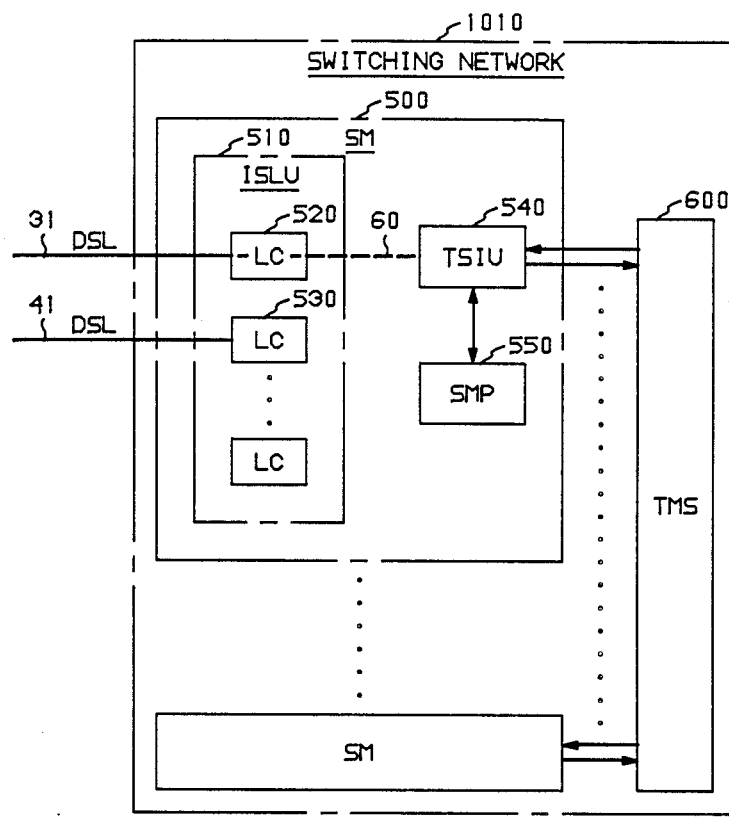
FIG. 8 is a diagram of switching network 1010 of FIG. 1.

FIG. 8 shows path 60 set up in response to allocation of a B-channel to a terminal on digital subscriber line 31 for a call. Switching network 1010 represents a time-multiplexed switch and a plurality of switching modules in the exemplary switching system disclosed in U.S. Pat. No. 4,592,048 Beckner et al. The control portion of each switching module, the switching module processor, is part of control arrangement 1020. Each switching module includes a time-slot interchange unit and a plurality of integrated services line units for terminating digital subscriber lines. FIG. 8 shows the switching module and integrated services line unit on which digital subscriber line 31 and digital subscriber line 41 terminate. Digital subscriber line 31 terminates at line card 520 of integrated services line unit 510 (FIG. 8). Digital subscriber line 41 terminates at line card 530 of integrated services line unit 510. Switching module processor 550 is a control unit of control arrangement 1020. Path 60 includes a path set up, under control of switching module processor 550, through time slot interchange unit 540 in switching module 500 to integrated services line unit 510 on which digital subscriber line 31 terminates. Path 60 also includes a path set up in integrated service line unit 510 to line card 520 on which digital subscriber line 31 terminates.

Allocation of a B-channel to a terminal also requires Allocation Data 6000 (FIG. 2) to be updated to reflect the allocation. The bit position for the terminal to which the B-channel is being allocated is set to one in the appropriate bit string, b1_alloc or b2_alloc, and all other bits are set to zero. The corresponding reservation bit string, b1_resv or b2_resv, is set equal to the allocation bit string. This allows the reservation procedure to function independently of whether the channel is reserved or allocated.

Although allocating a B-channel to one of the terminals addressed by the call advantageously decreases the answer time if that terminal answers the call, the allocation may cause another terminal to become B-channel blocked. If the terminal to which the B-channel has been allocated does not answer the call and is not using the B-channel for any other purposes, the allocation has unnecessarily tied up the B-channel. To avoid unnecessary B-channel blocking, switch 1000 advantageously reallocates B-channels. Reallocation may allow a terminal that would otherwise be B-channel blocked to answer a call. Switch 1000 attempts reallocation when one terminal requests allocation of a B-channel for processing a call for which another terminal has already been allocated a B-channel. Before reallocating the B-channel, switch 1000 determines whether the other terminal is using the B-channel for any other calls and allows reallocation only if the B-channel is not being used. Since the reallocation allows the only call that required the B-channel to be processed, no calls become unanswerable from the reallocation. Such an arrangement takes advantage of path set-up having already been performed while avoiding unnecessary blocking.

Figure 9:
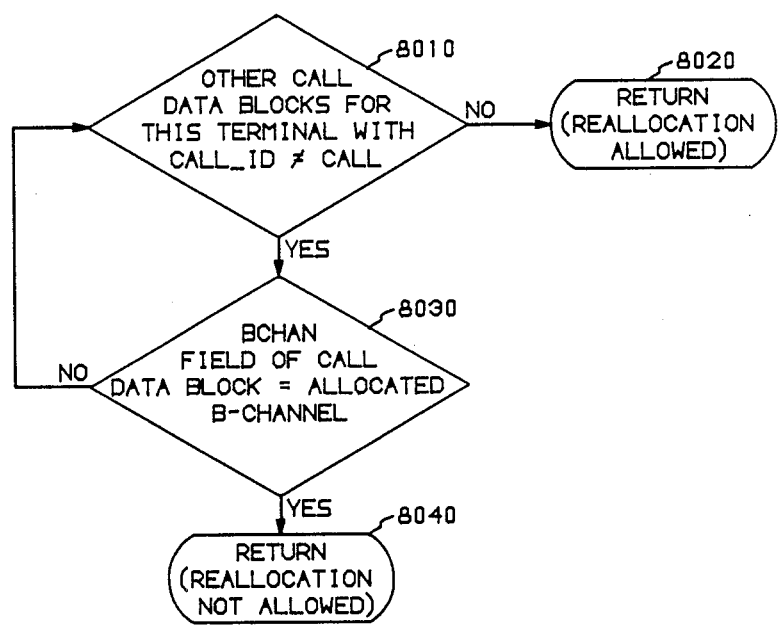
FIG. 9 is a flowchart for a call processing program used in the system of FIG. 1 to determine whether a B-channel may be reallocated from one terminal to another terminal.

Switch 1000 determines whether a terminal is using the B-channel for any other calls using the procedure defined by the flowchart in FIG. 9. Processing begins with block 8010 at which switch 1000 searches for any call data blocks for other calls at the terminal. If such a block is found, processing continues with block 8030 where switch 1000 checks if the bchan field in the block is equal to the allocated B-channel. If it is the allocated B-channel, processing continues with block 8040. The terminal is using the B-channel for another call so the B-channel cannot be reallocated to another terminal. The procedure returns an indication that reallocation is not allowed. If the check at block 8030 of the bchan field fails, the processing returns to block 8010 where switch 1000 searches for another call data block and repeats the above process. Whenever block 8010 is reached and another call data block is not found, processing continues with block 8020. If block 8020 is reached, the terminal is not using the B-channel for any other calls. The procedure returns an indication that the B-channel can be reallocated.

Reallocation is useful in processing calls to a directory number shared by a group of terminals when a B-channel is initially allocated to one of the terminals before offering the call. Assume that a call arrives at switch 1000 for a directory number DN7 shared by terminals 2301 and 2302 on digital subscriber line 31. Further assume that B-channel B1 on digital subscriber line is allocated to terminal 2300 and that B-channel B2 is unreserved and available for a voice call. Terminal 2301 is the lead terminal for the key system group that shares directory number DN7 so switch 1000 allocates a B-channel to terminal 2301 for the call. Switch 1000 sends a message over the D-channel of digital subscriber line 31 to terminal 2301 offering the call and instructing terminal 2301 to audibly alert. Switch 1000 determines whether terminal 2302 should audibly or silently alert in response to the call. When a B-channel is allocated to one terminal in a group of terminals addressed by an incoming call, the reservation procedure used for the other terminals may be modified to take advantage of the possibility of reallocating the B-channel to one of the other terminals.

Various arrangements can be used to determine if terminals addressed by a call but not allocated a B-channel should audibly alert in response to the call or are B-channel blocked. One arrangement uses the reservation procedures discussed above to determine if the other terminals should audibly alert. An attempt is made to reserve a B-channel for the other terminals. The other terminals audibly alert if they are granted a reservation or if they already have a reservation on another B-channel or a B-channel is free. In addition, terminals that otherwise would be B-channel blocked may audibly alert for a call or set of calls for which another terminal on the digital subscriber line was allocated a B-channel and that other terminal is not using the B-channel for any other calls.

Another arrangement is not to grant any reservations for the terminals that are not allocated a B-channel. Under this procedure switch 1000 uses a similar procedure to that shown by the flowchart of FIG. 5 to determine whether the other terminals may audibly alert in response to the call. Under the terms used in FIG. 5, the other B-channel is the B-channel that was not allocated for the call. Terminals other than the terminal that was allocated a B-channel may audibly alert when the other B-channel is available for a voice call and is not reserved. The other terminals may also audibly alert when they have a reservation on the other B-channel. If the other B-channel is available for the other terminals to answer the call, switch 1000 instructs the other terminals to alert audibly. In addition, terminals that otherwise would be B-channel blocked may audibly alert for a call or set of calls for which another terminal on the digital subscriber line was allocated a B-channel and that other terminal is not using the B-channel for any other calls. Otherwise, the other terminals silently alert.

Both of these arrangements require an additional decision step in the flowchart of FIG. 6 so that the terminals are not instructed to stop audible alerting and begin silent alerting whenever a B-channel transition occurs. After determining at block 6020 that there are terminals audibly alerting that do not have a reservation, a check must be made if the terminals are audibly alerting in response to a call or set of calls for which another terminal on the digital subscriber line was allocated a B-channel. If this is the case and the other terminal is not using the B-channel for any other calls, the terminals may continue to audibly alert and processing of the procedure defined by FIG. 6 ends. If this is not the case, processing continues with block 6030.

In the example of a call to terminals 2301 and 2302 where B-channel B2 was allocated to terminal 2301, under either of these arrangements, switch 1000 would determine that terminal 2301 did not require the B-channel for any other calls. Thus, B-channel B2 could be reallocated from terminal 2301 to terminal 2302 to allow terminal 2302 to answer the call. In this case, switch 1000 sends a message to terminal 2302 instructing terminal 2302 to alert audibly in response to the call.

Even if reallocation is not taken into account when deciding whether a terminal should audibly or silently alert in response to a call, reallocation could be used to allow even the terminals that are silently alerting in response to a call to answer the call. This has the advantage of increasing the chances of a terminal being able to answer a call rather than being B-channel blocked but has the disadvantage of not providing a consistent user interface. Some silent alerting calls will be answerable because a B-channel could be reallocated but others will not be answerable because no B-channel could be reallocated. The two arrangements discussed above that take reallocation into account when offering the call provide a consistent user interface in addition to allowing terminals to audibly alert whenever a B-channel is available for answering the call.

Consider how reallocation may be used when a terminal sharing a directory number attempts to answer a call for which another terminal was allocated a B-channel. From the example above, assume further that switch 1000 receives a message from terminal 2302 requesting to answer the call. By performing the procedure defined in the flowchart of FIG. 9, switch 1000 determines that B-channel B2 can be reallocated. After determining that the B-channel may be reallocated, switch 1000 changes the bit string b2—alloc for digital subscriber line 31 in Allocation Data 6000 to reflect the new terminal for which the B-channel is allocated. The new value of b2—alloc is "00000100." Switch 1000 then enables terminal 2302 to answer the call. The same path may be used that was established when the B-channel was originally allocated in response to the call. This avoids the delay of setting up a new path through the switching network to the B-channel of the digital subscriber line and allows terminals that otherwise would be B-channel blocked to answer calls.

Reallocation of a B-channel is useful in other call processing scenarios. For example, reallocation of a B-channel may be used advantageously to allow terminals other than a terminal that placed a call on hold to reanswer a held call. When a call is placed on hold, the B-channel is still allocated to the terminal that placed the call on hold. This terminal may originate another call using the B-channel or may answer an incoming call using the B-channel. Assume that terminal 2302 from the example above places the call to directory number DN7 on hold. The call was using B-channel B2 of digital subscriber line 31. Directory number DN7 is a shared by terminals 2301 and 2302. The user of terminal 2301 wants to reanswer the held call. A message is sent from terminal 2301 to the switch requesting to answer the held call. Switch 1000 uses the procedure defined by the flowchart of FIG. 9 to determine whether terminal 2302 that placed the call on hold has any other use for B-channel B2. If terminal 2302 does not have any other calls associated with it and thus no other use for B-channel B2, switch 1000 reallocates the B-channel from terminal 2302 to terminal 2301 to allow the other terminal to answer the held call. Switch 1000 performs this reallocation by changing bit string b2_alloc in Allocation Data 6000. The new value of b2_alloc is "00000010." Switch 1000 enables the terminal 2301 to retrieve the held call. Reallocation in this situation has the advantage of allowing a terminal that otherwise may have been B-channel blocked to pick up the held call. This also has the advantage of eliminating the need for establishing a new path through switching network 1010 since the path established when the channel was originally allocated may be used.

Similar advantages exist for reallocating B-channels when forwarding a call from one terminal to another terminal. If a call is forwarded from one terminal to another terminal on the same digital subscriber line, the B-channel allocated to the forwarding terminal may be reallocated to the forward-to terminal. For example, assume a call arrives for terminal 2400 on digital subscriber line 41. B-channel B1 of digital subscribe line 41 is allocated for that terminal. Terminal 2400 has the feature call_forwarding_no_answer activated. This feature provides for a call to be forwarded after the call has alerted at the terminal for a designated period of time. In response to the incoming call, switch 1000 sends a message to terminal 2400 offering the call to the terminal and requesting the terminal to alert in response to the call. After alerting terminal 2400 for a designated period of time, switch 1000 determines that the call should be forwarded. Assume further that the forward-to terminal is terminal 2401 is on the same digital subscriber line as terminal 2400 from which the call is being forwarded. If one B-channel is allocated to terminal 2400 from which the call is being forwarded and the other B-channel is being used by a terminal other than terminal 2401, no unallocated B-channels are available to be allocated to terminal 2401 and the forward request would have to be denied. However, if B-channel B2 allocated to the forwarding terminal can be reallocated to the forward-to terminal the call could be forwarded. This reallocation is allowed if the forwarding terminal is not using the B-channel for any other purpose. Switch 1000 uses the procedure defined by the flowchart in FIG. 9 to determine whether forwarding terminal 2400 is using B-channel B2 for any other calls. If the terminal is not using the B-channel, switch 1000 reallocates the B-channel to the forward-to terminal and forwards the call to the forward-to terminal. As part of forwarding the call, switch 1000 sends a message to the forward-to-terminal offering the call and instructing the terminal to alert in response to the call. This reallocation arrangement is useful for any call forwarding feature and not only for the call_forwarding_no_answer feature.

Reallocation of a B-channel may also advantageously be used with a call pick-up feature. Call pick-up allows a call that is alerting at one terminal to be answered at another terminal even though the other terminal is not addressed by the call. When a terminal is assigned the call pick-up feature certain other terminals are identified as terminals for which the terminal can answer calls. When a user at the terminal having the call pick-up feature uses the feature by pressing the associated feature button or dialing a special code, the switching system checks if any of the identified terminals are alerting. If an identified terminal is alerting, the switching system causes the most recent alerting call at the identified terminal to be answered by the terminal making the call pick-up request. For example, assume the call pick-up feature has been provided for both terminal 2403 and 2404 on digital subscriber line 41 to allow either terminal to be used to answer calls alerting at the other terminal. A call arrives for terminal 2403. B-channel B2 is allocated for that terminal. Assume further that B-channel B1 is unavailable for voice calls. While terminal 2403 is alerting in response to the call, a user at terminal 2404 engages the call pick-up feature by going offhook on terminal 2404 and dialing a special code. The use may also engage the call pick-up feature by pressing a feature button designated for the feature on the terminal. Without reallocation of a B-channel, terminal 2404 is B-channel blocked and cannot pick-up the call. However, if B-channel B2 originally allocated for the call can be reallocated to terminal 2404, terminal 2404 can pickup the call. This reallocation is allowed if alerting terminal 2403 is not using B-channel B2 for any other purpose. Switch 1000 uses the procedure defined by the flowchart in FIG. 9 to determine whether the terminal 2403 is using the B-channel for any other calls. If the reallocation is allowed, switch 1000 reallocates B-channel B2 to terminal 2404 by modifying the corresponding allocation bit string in Allocation Data 6000 and enables the terminal to answer the call using the reallocated B-channel.

In any of the above scenarios, reallocation may either be used whenever possible or only when a terminal is B-channel blocked and has no other B-channel available. This is a design decision that must be made based on the individual implementation of the reallocation procedure.

The above-described procedures are merely illustrative of the principles of the present invention and many variations may be devised by those skilled in the art without departing from the spirit and scope of the invention. It is therefore intended that such variations be included within the scope of the claims.

We claim:

1. A method for use by a switching system connectable to a plurality of terminals by a single line comprising a plurality of channels, said method comprising
   in response to one call, allocating one of said plurality of channels of said line for the exclusive use of one of said plurality of terminals, and
   enabling another one of said plurality of terminals to process said one call by reallocating said one channel for the exclusive use of said other terminal, said method further comprising
   before said enabling step, determining whether said one terminal requires said one channel to process any calls other than said one call, and
   wherein said enabling step comprises upon determining that said one terminal does not require said one channel to process any calls other than said one call, enabling said other terminal to process said one call by reallocating said one channel for the exclusive use of said other terminal.

2. A method in accordance with claim 1, wherein said system stores call data for said one terminal defining any calls at said one terminal that are assigned to said one channel, said determining step comprising
  reading said call data stored for said one terminal,
  determining that said one terminal requires said one channel to process a call other than said one call when said read call data defines another call as assigned to said one channel, and
  determining that said one terminal requires said one channel to process no calls other than said one call when said read call data defines no calls at said one terminal other than said one call as assigned to said one channel.

3. A method for use by a switching system connectable to a plurality of terminals by a single line comprising a plurality of channels, said method comprising
  in response to one call, allocating one of said plurality of channels of said line for the exclusive use of one of said plurality of terminals, and
  enabling another one of said plurality of terminals to process said one call by reallocating said one channel for the exclusive use of said other terminal, wherein said one terminal and said other terminal share a directory number and said one call is an incoming call for said directory number, said method further comprising
  before said enabling step, requesting both said one terminal and said other terminal to alert in response to said one call.

4. A method in accordance with claim 3, further comprising
  receiving a request from said other terminal to answer said one call, and
  wherein said enabling step is performed in response to receipt of said request from said other terminal.

5. A method in accordance with claim 4, wherein said enabling step comprises
  determining whether said one terminal requires said one channel to process any calls other than said one call, and
  on determining that said one terminal does not require said one channel to process any calls other than said one call, enabling said other terminal to answer said one call by reallocating said one channel for the exclusive use of said other terminal.

6. A method in accordance with claim 4, wherein said enabling step comprises
  determining whether said one terminal requires said one channel to process any calls other than unanswered calls that address said one terminal and said other terminal,
  on determining that said one terminal does not require said one channel to process any calls other than unanswered calls that address said one terminal and said other terminal, enabling said other terminal to answer said one call by reallocating said one channel for the exclusive use of said other terminal.

7. A method for use by a switching system connectable to a plurality of terminals by a single line comprising a plurality of channels, said method comprising
  in response to one call, allocating one of said plurality of channels of said line for the exclusive use of one of said plurality of terminals, and
  enabling another one of said plurality of terminals to process said one call by reallocating said one channel for the exclusive use of said other terminal, said method further comprising
  after said allocating step, receiving a request from said one terminal to place said one call on hold,
  receiving a request from said other terminal to retrieve said one call from hold, and
  wherein said enabling step is performed in response to receipt of said request for retrieving said one call.

8. A method for use by a switching system connectable to a plurality of terminals by a single line comprising a plurality of channels, said method comprising
  in response to one call, allocating one of said plurality of channels of said line for the exclusive use of one of said plurality of terminals, and
  enabling another one of said plurality of terminals to process said one call by reallocating said one channel for the exclusive use of said other terminal, said method further comprising
  after said allocating step, determining that said one call is to be forwarded from said one terminal to said other terminal, and
  wherein said enabling step is performed in response to said determination.

9. A method for use by a switching system connectable to a plurality of terminals by a single line comprising a plurality of channels, said method comprising
  in response to one call, allocating one of said plurality of channels of said line for the exclusive use of one of said plurality of terminals, and
  enabling another one of said plurality of terminals to process said one call by reallocating said one channel for the exclusive use of said other terminal, wherein said other terminal has a call pick-up feature for answering calls alerting at said one terminal, said method further comprising
  after said allocating step, receiving a request from said other terminal to use said call pick-up feature to answer said one call, and
  wherein said enabling step is performed in response to said request.

10. A method for use by a switching system connectable to a plurality of terminals by a single line comprising a plurality of B-channels and a D-channel, said method comprising
  in response to one call, allocating one of said plurality of B-channels for the exclusive use of one of said plurality of terminals,
  examining call data stored for said one terminal defining any calls at said one terminal that are assigned to said one B-channel to determine whether said one terminal requires said one B-channel to process any calls other than said one call, and
  on determining that said one terminal does not require said one B-channel to process any calls other than said one call, reallocating said one B-channel for the exclusive use of another one of said plurality of terminals and enabling said other terminal to process said one call using said one B-channel.

11. A method in accordance with claim 10 wherein said one call is an incoming call for a directory number shared by said one terminal and another one of said terminals, said method further comprising
  requesting said one terminal and said other terminal to alert in response to said incoming call,
  after allocating said one B-channel to said one terminal, receiving a request on said D-channel from said other terminal to answer said one call, and wherein said step of enabling said other terminal to process said call comprises enabling said other terminal to answer said one call using said one B-channel.

12. A method in accordance with claim 10 further comprising
after said allocating step, receiving a request on said D-channel from said one terminal to place said one call on hold, and
receiving a request on said D-channel from said other terminal to retrieve said one call from hold,
wherein said step of examining call data is performed in response to said request to retrieve said one call, and
wherein said step of enabling said other terminal to process said one call comprises enabling said other terminal to retrieve said one call from hold and to process said one call using said B-channel.

13. A method in accordance with claim 10 wherein said one call is an incoming call for said one terminal, said method further comprising
after said allocating step, determining that said one call is to be forwarded from said one terminal to said other terminal,
performing said examining step in response to said determination that said one call is to be forwarded, and
wherein said step of enabling said other terminal to process said one call comprises forwarding said one call to said other terminal for answering at said other terminal using said one B-channel.

14. A method in accordance with claim 10 wherein said one call is an incoming call for said one terminal, said method further comprising
requesting said one terminal to alert in response to said one call,
after said allocating step, receiving a request on said D-channel from said other terminal to use a call pick-up feature to answer said one call, wherein said call pick-up feature allows said other terminal to answer calls that are alerting at said one terminal,
performing said examining step in response to receipt of said request, and
wherein said step of enabling said other terminal to process said one call comprises enabling said other terminal to answer said one call using said one B-channel.

15. A switching system connectable to a plurality of terminals by a single line comprising a plurality of channels, said system comprising
means responsive to one call for allocating one of said plurality of channels of said line for the exclusive use of one of said plurality of terminals,
means for identifying another one of said plurality of terminals as the terminal to process said one call, and
means responsive to said identification for enabling said other terminal to process said one call by reallocating for the exclusive use of said other terminal said one channel allocated by said allocating means to said one terminal in response to said one call.

16. A switching system in accordance with claim 15, wherein said identifying means comprises
means responsive to receipt of a message from said other terminal requesting to process said one call for identifying said other terminal as the terminal to process said one call.

17. A switching system in accordance with claim 15, wherein said identifying means comprises
means for determining that said one call is to be forwarded from said one terminal, and
means for identifying said other terminal as the terminal to which said one call is to be forwarded.

18. A switching system in accordance with claim 15 further comprising
means for determining whether said one terminal requires said one channel to process any calls other than said one call, and
wherein said enabling means comprises means responsive to a determination by said determining means that said one terminal does not require one channel to process any calls other than said one call for enabling said other terminal to process said one call by reallocating for the exclusive use of said other terminal said one channel allocated by said allocating means to said one terminal.

19. A switching system in accordance with claim 18 further comprising
means for storing call data for said one terminal defining any calls at said one terminal that are assigned to said one channel, and
wherein said determining means comprises
means for reading said call data stored by said storing means,
means for determining that said one terminal requires said one channel to process a call other than said one call when said call data read by said reading means defines another call at said one terminal as assigned to said one channel, and
means for determining that said one terminal requires said one channel to process no calls other than said one call when said call data read by said reading means defines no calls other than said one call at said one terminal as assigned to said one channel.

20. A switching system connectable to a plurality of terminals by a single line comprising a plurality of B-channels and a D-channel, said system comprising
means responsive to one call for allocating one of said plurality of B-channels for the exclusive use of one of said plurality of terminals,
means for storing call data for said one terminal defining any calls at said one terminal that are assigned to said one channel,
means for identifying another one of said plurality of terminals as the terminal to process said one call,
means responsive to said identification for reading said call data stored for said one terminal by said storing means,
means for determining from said call data read by said reading means whether said one terminal requires said one B-channel to process any calls other than said one call, and
means responsive to a determination by said determining means that said one terminal does not require said one B-channel to process any calls other than said one call for reallocating said one B-channel for the exclusive use of said other terminal identified by said identifying means and for enabling said other terminal to process said one call using said one B-channel.

21. A switching system in accordance with claim 20, wherein said one call is an incoming call for a directory number shared by a multiple number of said plurality of terminals and said one terminal is one of said multiple terminals, said system further comprising means for requesting each of said multiple terminals to alert in response to said one call, wherein said identifying means comprises means responsive to receipt of a request from said other terminal to answer said one call for identifying said other terminal as the terminal to process said one call, and wherein said means for enabling said other terminal to process said one call comprises means for enabling said other terminal to answer said one call using said one B-channel.

22. A switching system in accordance with claim 20 further comprising means for placing said one call on hold, wherein said identifying means comprises means responsive to receipt of a request from said other terminal to retrieve said one call from hold for identifying said other terminal as the terminal to process said one call, and wherein said means for enabling said other terminal to process said one call comprises means for enabling said other terminal to retrieve said one call from hold.

23. A switching system in accordance with claim 20, wherein said one call is an incoming call for said one terminal, wherein said identifying means comprises means for determining that said one call is to be forwarded from said one terminal, and means for identifying said other terminal as the terminal to which said one call is to be forwarded, and wherein said means for enabling said other terminal to process said one call comprises means for forwarding said one call to said other terminal for answering at said other terminal using said one B-channel.

24. A switching system in accordance with claim 20, wherein said one call is an incoming call for said one terminal, said system further comprising means for requesting said one terminal to alert in response to said incoming call, wherein said reading means is responsive to receipt of a request from another one of said terminals for using a call pick-up feature to answer said one call, wherein said call pick-up feature allows said other terminal to answer calls that are alerting at said one terminal, and wherein said means for enabling said other terminal to process said one call comprises means for enabling said other terminal to answer said one call using said one B-channel.

* * * * *